US009469196B2

(12) United States Patent
Kim (10) Patent No.: US 9,469,196 B2
(45) Date of Patent: Oct. 18, 2016

(54) CONTROL BOARD HAVING STEERING WHEEL AND ACCELERATOR PEDAL INTEGRATED STRUCTURE (71) Applicant: Hyundai Motor Company, Seoul (KR)

(72) Inventor: Eun-Sik Kim, Gwangmyeong-Shi (KR)

(73) Assignee: Hyundai Motor Company, Seoul (KR)

( * ) Notice: Subject to any disclaimer, the term of this patent is extended or adjusted under 35 U.S.C. 154(b) by 141 days.

(21) Appl. No.: 14/563,273

(22) Filed: Dec. 8, 2014

(65) Prior Publication Data
US 2016/0046190 A1    Feb. 18, 2016

(30) Foreign Application Priority Data

Aug. 12, 2014 (KR) ........................ 10-2014-0104210

(51) Int. Cl.
*B60K 37/06* (2006.01)
*B60K 20/08* (2006.01)
(Continued)

(52) U.S. Cl.
CPC ............... *B60K 37/06* (2013.01); *B60K 20/08* (2013.01); *B60K 26/02* (2013.01); *B60K 37/04* (2013.01); *B60R 21/055* (2013.01); *B62D 1/02* (2013.01); *B62D 1/22* (2013.01); *B60K 2026/024* (2013.01); *B60K 2026/029* (2013.01); *B60K 2350/1024* (2013.01); *B60K 2350/1048* (2013.01); *B60K 2350/406* (2013.01)

(58) Field of Classification Search
CPC  B60K 37/04; B60K 37/06; B60K 2026/024; B60K 2026/029; B60K 26/00; B60K 26/02; B60K 20/08; B62D 1/02; B62D 1/22
See application file for complete search history.

(56) References Cited

U.S. PATENT DOCUMENTS 1,972,037 A * 8/1934 Yonge .................... B60K 26/00
                                                    123/179.1
4,476,954 A * 10/1984 Johnson ................ B60W 30/18
                                                    123/352
(Continued)

FOREIGN PATENT DOCUMENTS

JP    2004-308434 A    11/2004
JP    2005-225279 A     8/2005
(Continued)

OTHER PUBLICATIONS

Cumberford, Robert. Honda EV-STER, Automobilemag.com [online]. [Published Apr. 1, 2012], [Retrieved on Jun. 16, 2016]. Retrieved from the Internet <URL: http://www.automobilemag.com/news/by-design-honda-ev-ster/>.*
(Continued)

*Primary Examiner* — Barry Gooden, Jr.
(74) *Attorney, Agent, or Firm* — Morgan, Lewis & Bockius LLP (57) ABSTRACT A control board having an integrated structure of a steering wheel and an accelerator pedal may include a control board that may be disposed ahead of a driver's seat in a vehicle, an accelerator pedal lever that moves up/down on the control board, a steering wheel that may be turnably mounted by a coupling hole at an upper portion of the accelerator pedal lever, a shift button unit and a start button unit that may be formed in types of buttons on the control board, and a shock-absorbing member that may be disposed at a lower end of the control board, wherein the control board may be connected to a cylinder rod in a dashboard, so the control board pops up in use and returns not in use.

7 Claims, 8 Drawing Sheets (51) Int. Cl.
  *B62D 1/02*   (2006.01)
  *B60K 37/04*  (2006.01)
  *B60K 26/02*  (2006.01)
  *B60R 21/055* (2006.01)
  *B62D 1/22*   (2006.01)

(56) References Cited

U.S. PATENT DOCUMENTS

| | | | | |
|---|---|---|---|---|
| 5,126,941 | A * | 6/1992 | Gurmu | G01C 21/3492 |
| | | | | 340/989 |
| 5,261,291 | A * | 11/1993 | Schoch | B60K 37/06 |
| | | | | 180/333 |
| 5,297,650 | A * | 3/1994 | Gandiglio | B60L 15/20 |
| | | | | 180/204 |
| 6,006,852 | A * | 12/1999 | Eckstein | B60K 26/02 |
| | | | | 180/333 |
| 6,360,149 | B1 * | 3/2002 | Kwon | B60K 35/00 |
| | | | | 114/144 R |
| 6,675,508 | B2 * | 1/2004 | Tamaru | E02F 9/16 |
| | | | | 180/333 |
| 9,126,621 | B1 * | 9/2015 | Kim | G05G 1/34 |
| 9,315,103 | B2 * | 4/2016 | Yamauchi | B60K 26/02 |
| 2002/0157284 | A1 * | 10/2002 | Tamaru | E02F 9/16 |
| | | | | 37/348 |
| 2004/0099468 | A1 * | 5/2004 | Chernoff | B60T 7/085 |
| | | | | 180/409 |
| 2004/0133322 | A1 * | 7/2004 | Chernoff | B60K 26/02 |
| | | | | 701/41 |
| 2006/0118350 | A1 * | 6/2006 | Suyama | B60T 7/02 |
| | | | | 180/332 |
| 2008/0277190 | A1 * | 11/2008 | McCord | B62D 1/12 |
| | | | | 180/444 |
| 2009/0011831 | A1 * | 1/2009 | Yamada | A63F 13/10 |
| | | | | 463/37 |
| 2013/0062904 | A1 * | 3/2013 | Elhardt | B60K 37/00 |
| | | | | 296/70 |
| 2013/0104532 | A1 * | 5/2013 | Ries | B60W 30/18045 |
| | | | | 60/327 |
| 2013/0148325 | A1 * | 6/2013 | Guering | B60K 37/00 |
| | | | | 361/809 |
| 2013/0160737 | A1 * | 6/2013 | Case | F02D 11/10 |
| | | | | 123/339.25 |
| 2013/0264139 | A1 * | 10/2013 | Braun | E02F 9/16 |
| | | | | 180/322 |
| 2013/0327174 | A1 * | 12/2013 | Jun | B60K 26/02 |
| | | | | 74/482 |
| 2014/0138166 | A1 * | 5/2014 | Otto | B62D 1/22 |
| | | | | 180/6.48 |
| 2015/0032321 | A1 * | 1/2015 | Wimmer | B60W 50/082 |
| | | | | 701/23 |
| 2015/0060185 | A1 * | 3/2015 | Feguri | B60T 7/10 |
| | | | | 180/333 |
| 2015/0112506 | A1 * | 4/2015 | Hanlin | F02M 21/029 |
| | | | | 701/1 |
| 2015/0120089 | A1 * | 4/2015 | Peel | B60T 7/16 |
| | | | | 701/2 |
| 2016/0009174 | A1 * | 1/2016 | Yamauchi | B60K 26/02 |
| | | | | 74/473.3 |
| 2016/0121917 | A1 * | 5/2016 | Bonfante, Jr. | B62D 1/14 |
| | | | | 74/473.2 |

FOREIGN PATENT DOCUMENTS

| | | |
|---|---|---|
| JP | 2006-103511 A | 4/2006 |
| JP | 2008-290634 A | 12/2008 |
| KR | 10-2010-0071208 | 6/2010 |

OTHER PUBLICATIONS

Yvkoff, Liane. Next-Generation Steering Wheel Folds Entirely Away, Cnet.com [online]. [Published Jun. 30, 2011], [Retrieved Jun. 16, 2016]. Retrieved from the Internet <http://www.cnet.com/roadshow/news/next-generation-steering-wheel-folds-entirely-away/>.*

* cited by examiner

CONTROL BOARD HAVING STEERING WHEEL AND ACCELERATOR PEDAL INTEGRATED STRUCTURE

CROSS-REFERENCE TO RELATED APPLICATIONS

The present application claims priority to Korean Patent Application No. 10-2014-104210, filed on Aug. 12, 2014, the entire contents of which is incorporated herein for all purposes by this reference.

BACKGROUND OF THE INVENTION

1. Field of the Invention

The present invention relates to an automobile control board, and more particularly, to a structure for more conveniently and safely controlling a vehicle by providing a control board having an integrated structure that can control functions for driving a vehicle such as a steering wheel and an acceleration pedal.

2. Description of Related Art

In general, an automobile steering wheel is a part for a driver to control the driving course of a vehicle by controlling the direction of wheels and a driver has to mechanically turn it in order to control the direction of wheels.

Drivers have to operate the accelerator pedal and the brake pedal in order to control the speed of vehicles and have to operate a gear-shifting part such as a shift lever for shifting.

Recently, an automatic transmission is more used rather than a manual transmission to improve safety of vehicles and operational convenience for drivers and technologies have been developed such that drivers can turn a steering wheel in desired directions even without a large force through a power steering wheel.

However, drivers have to keep holding a steering wheel when driving for the structure of steering wheels, so their arms are forced in long-time driving.

Since they have to frequently operate the accelerator pedal and the brake pedal, their legs and ankles are also forced. In addition, since they have to stretch their arms to activate a heater, an air conditioner, and a radio through a center fascia, they cannot look at the front in this case and it is very uncomfortable.

Since a cluster under a steering wheel is hidden by the steering wheel, it is usually not shown well and it is more hidden when the driver's seat is moved, and airbags are not operated in a collision in many cases, such that it is urged to take measures against those problems.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control board having an integrated structure of a steering wheel and an accelerator pedal which reduces fatigue of drivers by supporting the arms of drivers who are driving.

The present invention may have also been made in an effort to provide a control board having an integrated structure of a steering wheel and an accelerator pedal which can reduce fatigue of a driver and precisely control driving of a vehicle by enabling the driver to operate a steering wheel and an accelerator pedal with his/her hands.

The present invention may have also been made in an effort to provide a control board having an integrated structure of a steering wheel and an accelerator pedal which can improve convenience of driving and the design of a vehicle by enabling a driver to control various functions for driving a vehicle and for their convenience and can keep a driver safe by having a shock-absorbing member thereunder.

The technical subject to implement in the present invention are not limited to the technical problems described above and other technical subjects that are not stated herein will be clearly understood by those skilled in the art from the following specifications.

An aspect of the present invention provides a control board having an integrated structure of a steering wheel and an accelerator pedal may include a control board that is disposed ahead of a driver's seat in a vehicle, an accelerator pedal lever that moves up/down on the control board, a steering wheel that is turnably mounted by a coupling hole at the upper portion of the accelerator pedal lever, a shift button unit and a start button unit that are formed in the types of buttons on the control board, and a shock-absorbing member that is disposed at the lower end of the control board, in which the control board is connected to a cylinder rod in a dashboard, so the control board pops up in use and returns not in use.

Two springs may be connected to the accelerator pedal lever and the accelerator pedal lever may automatically return to an initial position when a force is not applied.

The steering wheel may include a magnet assembly composed of five magnets connected through the coupling hole formed at the upper portion of the accelerator pedal lever, and a torsion spring that keeps the steering wheel at a center position.

A groove may be formed at a side on the top of the steering wheel.

The control board may further include a wiper operation unit and a headlight operation unit that are turnably disposed on the control board.

The control board may further include a vehicle function button unit formed in the type of a button on the control board.

The control board may further include a mode scroll unit formed in the type of a button on the control board and adjusting functions of the vehicle function button unit.

According to the present invention, since a steering wheel, an accelerator pedal, a start button unit, a wiper operation unit, and a headlight operation unit for driving a vehicle are integrated on a control board, a driver can feel less tired and can more conveniently drive a vehicle.

Since various functions for driving a vehicle and convenience are controlled through a control board, it is possible to improve convenience of using a vehicle and the internal design of a vehicle.

Since a shock-absorbing member is attached to the lower end of a control board, it is possible to minimize injury by holding the body of a driver even if an airbag fails to operate in a collision.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the terms to describe most appropriately the best method he or she knows for carrying out the invention. Therefore, the configurations described in the exemplary embodiments and drawings of the present invention are merely most preferable embodiments but do not represent all of the technical spirit of the present invention. Thus, the present invention should be construed as including all the changes, equivalents, and substitutions included in the spirit and scope of the present invention at the time of filing this application.

The terminologies used herein are for describing specific embodiments and do not limit the present invention. As used herein, singular terms may include plural terms, if not clearly indicating other cases in the contexts.

The present invention, which allows more convenient and safe control of a vehicle by giving a control board an integrated structure capable of controlling functions for driving a vehicle such as a steering wheel and an accelerator pedal, includes: a control board 100 that is disposed ahead of a driver's seat in a vehicle, an accelerator pedal lever 200 that can move up/down on the control board, a steering wheel 300 that is turnably mounted by a coupling hole 220 at the upper portion of the accelerator pedal lever, a shift button unit 400 and a start button unit 500 that are formed in the types of buttons on the control board, and a shock-absorbing member 600 that is disposed at the lower end of the control board. The control board is connected to a cylinder rod 130 in a dashboard 110, so it pops up in use and returns not in use.

Figure 1:
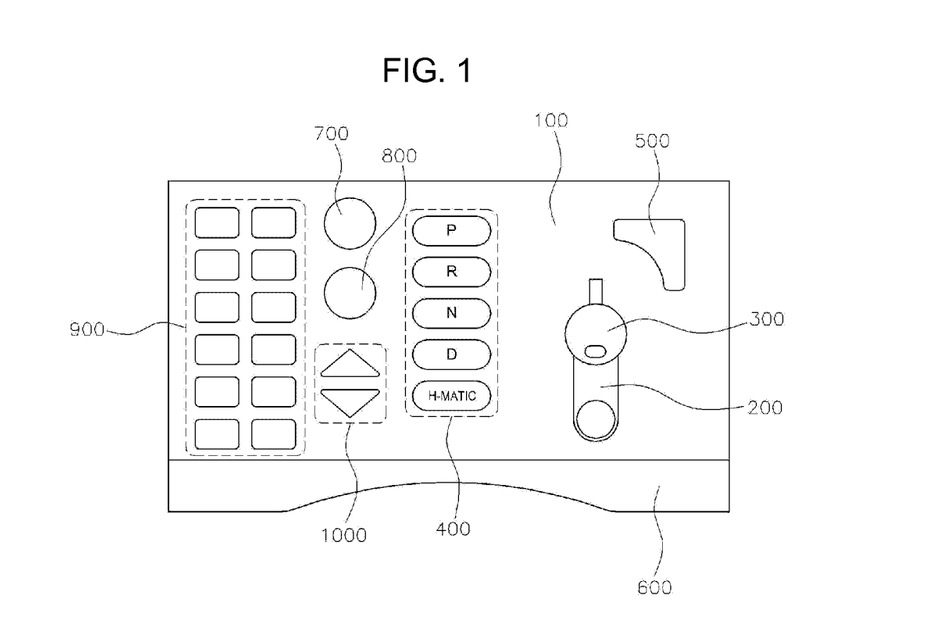
FIG. 1 is a front view of a control board having an integrated structure of a steering wheel and an accelerator pedal according to an exemplary embodiment of the present invention.

FIG. 1 is a front view of a control board having an integrated structure of a steering wheel and an accelerator pedal according to an exemplary embodiment of the present invention.

The control board 100 of the present invention, a flat part with various buttons for driving and controlling a vehicle thereon, may be disposed ahead of a driver's seat in a vehicle and may be mounted on a center fascia to pop up in use.

The control board can be formed in various shapes in considering of convenience of manufacturing and using a vehicle and the design of the vehicle and may be formed not in a plane, but three dimensionally.

The accelerator pedal lever 200 capable of moving up/down is disposed at a side on the control board 100. The accelerator pedal lever is a part performing the same function as the existing accelerator pedals that are disposed under the driver's seat and that a driver can control with a foot, so when it is moved up, the effect of applying a force to an existing accelerator pedal is obtained, and when it is moved down, the effect of removing the force applied to an existing accelerator pedal is obtained.

Two springs 210 are connected to the upper end of the accelerator pedal lever 200, so the accelerator pedal lever automatically moves down, when a driver does not apply a force. Accordingly, although a driver can move down the accelerator pedal lever in person, when a force applied to the accelerator pedal level is removed, it is naturally moved down by the return force of the springs.

The coupling hole 220 is formed at the upper portion of the accelerator pedal lever 200 and the steering wheel 300 is turnably mounted by the coupling hole. Similarly, the steering wheel performs the same function as common steering wheels of vehicles and will be described in detail below.

The shift button unit 400 and the start button unit 500 are formed in the types of buttons at a side on the control board 100. Referring to FIG. 1, the shift button unit is positioned at the left side from the accelerator pedal lever 200 and the steering wheel 300 and the start button unit is positioned at the right side over them, but the button units may be implemented in various types at different positions, if necessary.

The shift button unit 400, a part that controls driving modes of a vehicle, that is, controls shifting, includes shift buttons including a P-shift button for parking, an R-shift button for reversing, an N-shift button for a neutral position, and a D-shift button for driving.

The start button unit 500, a part that can start/stop the engine of a vehicle, has the advantage of being able to start/stop the engine of a vehicle in one-touch type.

The shock-absorbing member 600 is attached to the lower end of the control board 100. The shock-absorbing member is made of a material capable of absorbing a shock, so it prevents a driver's body that springs out in a collision from being injured. Such an example will be described below with reference to the figures.

A wiper operation unit 700 that can turn to control wipers and a headlight operation unit 800 that can turn to control headlights are further disposed on the control board 100.

For example, when the wiper operation unit 700 is turned clockwise, the wipers on the windshield of a vehicle start operating, and as the turning amount of the wiper operation unit increases, the wipers operate faster.

Similarly, when the headlight operation unit 800 is turned clockwise, the headlights of a vehicle are turned on, and the intensity of the headlights can be adjusted in proportion to the turning amount of the headlight operation unit.

A vehicle function button unit 900 is formed in the type of a button at a side on the control board 100, so convenience of driving can be improved.

The vehicle function button unit 900 may include radio-on/off buttons, radio frequency/volume buttons, heater/air conditioner intensity/direction buttons, drive mode (ECO, SPORTS, or the like) selection buttons, a DIS button, and an EPB button, and other than these buttons, function buttons necessary for driving a vehicle and various function buttons that can improve convenience for a driver may be included.

A mode scroll unit 1000 for adjusting the functions of the vehicle function button unit after the vehicle function button unit 900 is selected is disposed on the control board 100 and selected specific functions are scrolled only through the mode scroll unit, so that a driver can easily know the operation position.

For example, when a driver wants to change the radio frequency, he/she presses the radio frequency button of the vehicle function button unit 900 and then can change the radio frequency through the mode scroll unit 1000, and when a driver wants the adjust the radio volume, he/she presses the radio volume button of the vehicle function button and then can adjust the radio volume through the mode scroll unit.

It is obviously possible to control the intensity of a heater or an air conditioner, using the mode scroll unit, after pressing the heater intensity button or the air conditioner intensity button.

The parts mounted or formed on the control board 100 are based on a PCB for electrically recognizing them, respectively, and the PCBs may be disposed in the control board or under the parts.

Figure 2:
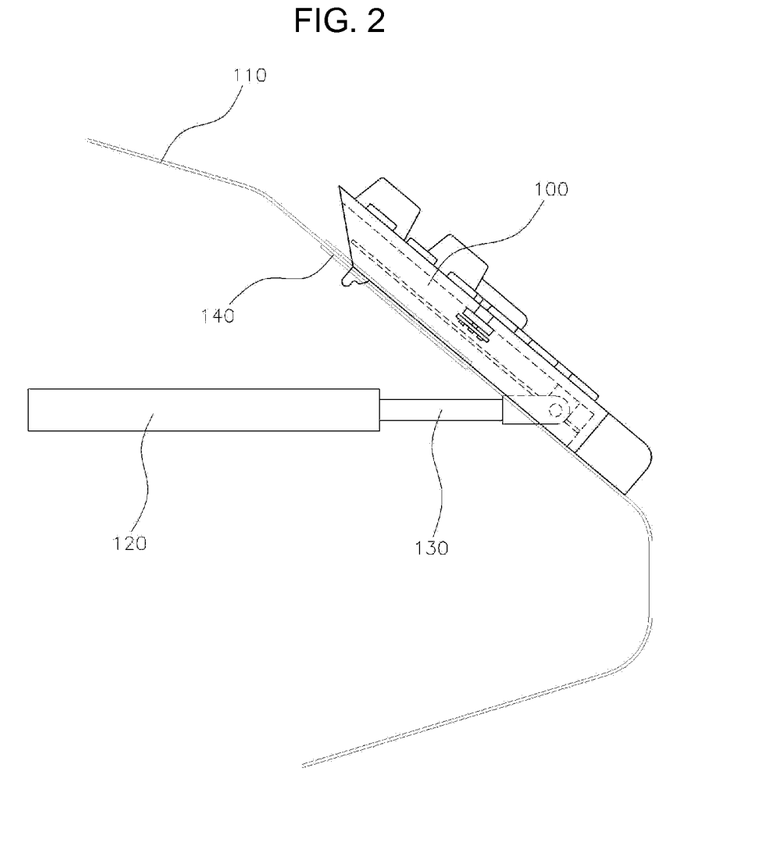
FIG. 2 is a side view illustrating a mounted position of the control board having an integrated structure of a steering wheel and an accelerator pedal according to an exemplary embodiment of the present invention.
Figure 3:
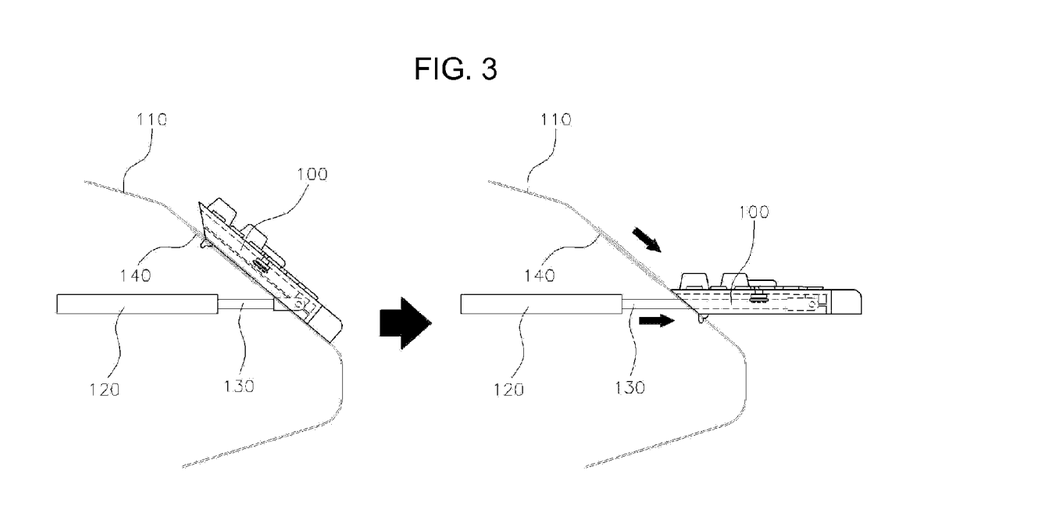
FIG. 3 is an exemplary view illustrating pop-up of the control board having an integrated structure of a steering wheel and an accelerator pedal according to an exemplary embodiment of the present invention.

FIG. 2 is a side view illustrating a mounted position of the control board having an integrated structure of a steering wheel and an accelerator pedal according to an exemplary embodiment of the present invention and FIG. 3 is an exemplary view illustrating pop-up of the integrated control board having an integrated structure of a steering wheel and an accelerator pedal according to an exemplary embodiment of the present invention, in which the way the control board 100 pops up for a driver is illustrated.

Referring FIG. 2 first, it can be seen the control board 100 is disposed on a dashboard 110 in close contact with it, covering a cluster 140. A cylinder is fixed in the dashboard and the cylinder rod 130 of the cylinder is connected with the control board.

Referring to FIG. 3, when a specific button in a vehicle or the start button unit 500 on the control board 100 is pressed, the cylinder rod 130 moves forward and the control board connected with the cylinder rod moves forward accordingly.

In this process, guides of the control board 100 slide down in guide holes of the dashboard 110 and are locked and fixed to the ends of the guide holes of the dashboard.

Popping-up is made in this way, but for return of the popping-up, in the opposite way, as the cylinder rod 130 moves backward, the control board 100 comes back in close contact with the dashboard 110.

For the popping-up in this way, specific guides need to be formed on the control board 100, guide holes need to be formed at both sides of the dashboard 110 so that the guides can slide, and a through-hole needs to be formed in the dashboard so that the cylinder rod 130 can move forward/backward.

Figure 4:
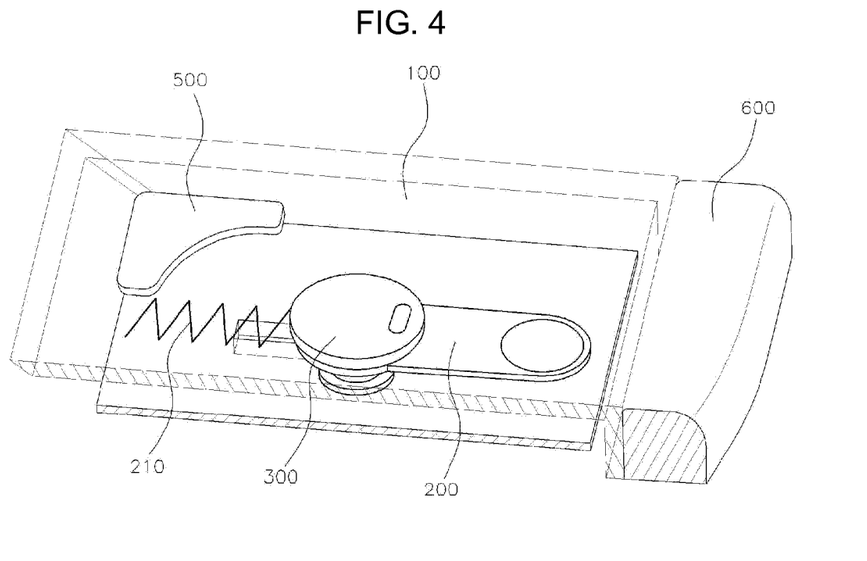
FIG. 4 is an exemplary view illustrating the structure of a steering wheel and an accelerator pedal lever according to an exemplary embodiment of the present invention.

FIG. 4 is an exemplary view illustrating the structure of a steering wheel and an accelerator pedal lever according to an exemplary embodiment of the present invention.

As described above, the steering wheel 300 is mounted on the accelerator pedal lever 200 and the springs 210 are connected to the upper end of the accelerator pedal lever, such that a driver can operate the accelerator pedal lever and the steering wheel with one hand and the accelerator pedal lever automatically returns to its initial position when a force is not applied.

Figure 5:
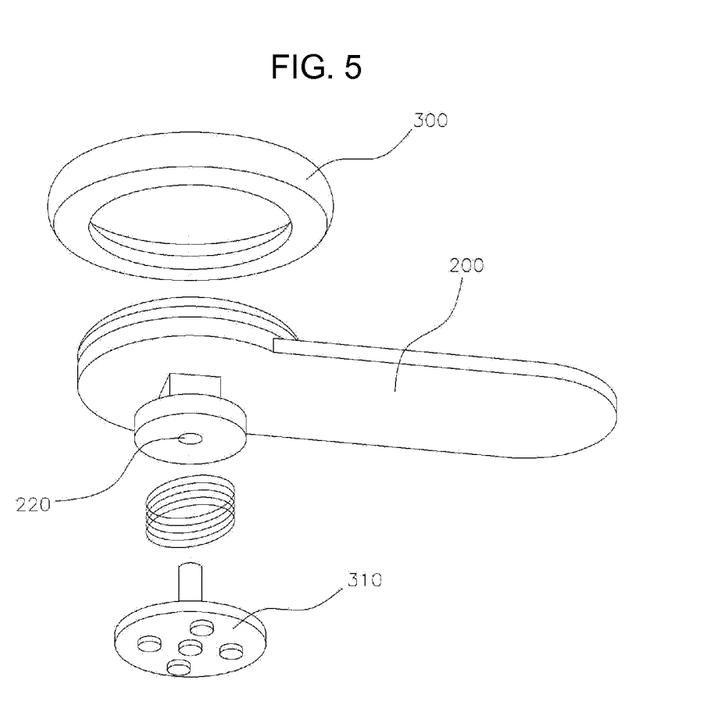
FIG. 5 is an exemplary view illustrating assemblage of the steering wheel and the accelerator pedal lever according to an exemplary embodiment of the present invention.

FIG. 5 is an exemplary view illustrating assemblage of the steering wheel and the accelerator pedal lever according to an exemplary embodiment of the present invention.

The coupling hole 220 is formed at the upper portion of the accelerator pedal lever 200 and the steering wheel 300 is combined through the coupling hole. The body of the steering wheel is disposed over the coupling hole and a magnet assembly 310 is disposed under the coupling hole, in which the magnet assembly includes five magnets.

The magnet assembly 310 includes one magnet for finding out the amount of acceleration when a vehicle runs straight and four magnets for finding out the amount of turning of the steering wheel 300, and thus, precise control is possible, when a driver operates the steering wheel with a hand or a finger.

The steering wheel includes a torsion spring that keeps the steering wheel at the center position over the magnet assembly, so the steering wheel can automatically return to the center position, when a force is not applied to the steering wheel.

Figure 6:
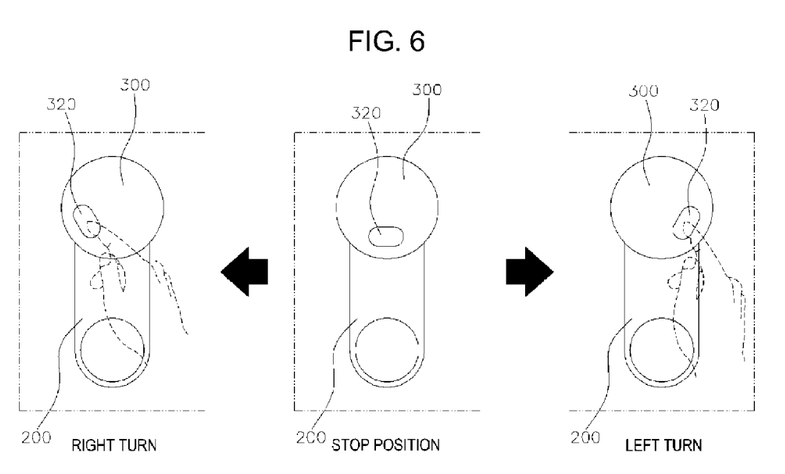
FIG. 6 is an exemplary view illustrating the operation principle of the steering wheel according to an exemplary embodiment of the present invention.

As an example, FIG. 6 illustrates the operation principle of the steering wheel according to an exemplary embodiment of the present invention, in which when the steering wheel 300 is turned clockwise, a vehicle turns right, and when it is turned counterclockwise, a vehicle turns left.

Similar to the accelerator pedal lever 200, since the steering wheel 300 can be returned by attraction and repulsion of magnets or a torsion spring so that a vehicle runs straight, the result would be the same as that of the steering wheel of the vehicle.

Figure 7:
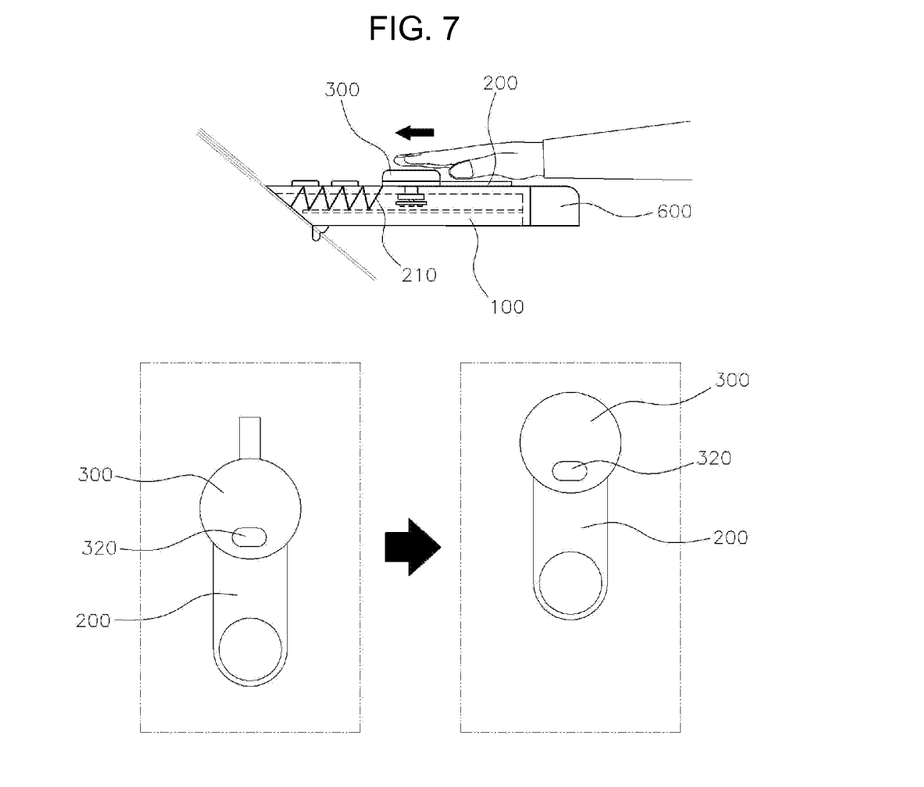
FIG. 7 is an exemplary view illustrating the operation principle of the accelerator pedal lever according to an exemplary embodiment of the present invention.

Similarly, FIG. 7 is an exemplary view illustrating the operation principle of the accelerator pedal lever according to an exemplary embodiment of the present invention. When a driver moves up the accelerator pedal lever 200 with a hand, a vehicle is accelerated, and when a driver moves down the accelerator pedal lever, a vehicle is decelerated.

Figure 8:
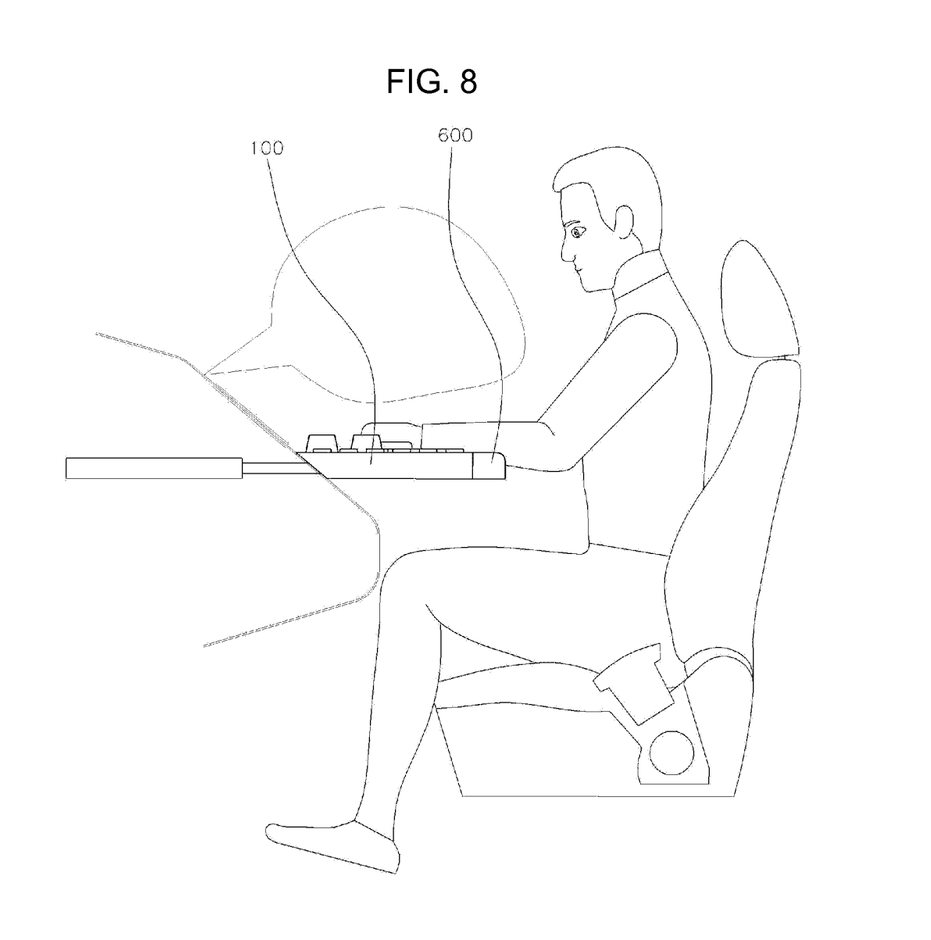
FIG. 8 is an exemplary view illustrating the function of a shock-absorbing member in a collision according to an exemplary embodiment of the present invention.

The same effect when a driver presses down an accelerator pedal with a foot and takes the foot off is obtained, such that a driver can more conveniently and precisely control acceleration of a vehicle, using a hand Finally, FIG. 8 is an exemplary view illustrating the function of a shock-absorbing member according to an exemplary embodiment of the present invention in a collision.

Since the shock-absorbing member 600 is attached to the lower end of the control board 100, it prevents a driver from spring out in a collision in cooperation with an airbag or independently from an airbag.

Even if an airbag operates, safety of a driver can be further secured, and when an airbag is not operated, the shock-absorbing member can minimize injury of a driver.

According to an exemplary embodiment of the present invention, since a steering wheel, an accelerator pedal, a start button unit, a wiper operation unit, and a headlight operation unit for driving a vehicle are integrated on a control board, a driver can feel less tired and can more conveniently drive a vehicle.

Since various functions for driving a vehicle and convenience are controlled through a control board, it is possible to improve convenience of using a vehicle and the internal design of a vehicle. In addition, since a shock-absorbing member is attached to the lower end of a control board, it is possible to keep a driver safer.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control board having an integrated structure of a steering wheel and an accelerator pedal, the control board comprising:
    the control board disposed ahead of a driver's seat in a vehicle;
    an accelerator pedal lever that moves up/down on the control board;
    a steering wheel that is turnably mounted by a coupling hole at an upper portion of the accelerator pedal lever;
    a shift button unit and a start button unit that are formed as buttons on the control board; and
    a shock-absorbing member that is disposed at a lower end of the control board,
    wherein the control board is connected to a cylinder rod in a dashboard, so the control board pops up in use and returns when not in use.

2. The control board of claim 1, wherein two springs are connected to the accelerator pedal lever and the accelerator pedal lever automatically returns to an initial position when a force is not applied thereto.

3. The control board of claim 1, wherein the steering wheel includes:
    a magnet assembly having five magnets connected through the coupling hole formed at the upper portion of the accelerator pedal lever; and
    a torsion spring that returns the steering wheel to a center position.

4. The control board of claim 3, wherein a groove is formed at a side on a top of the steering wheel.

5. The control board of claim 1, further comprising:
    a wiper operation unit and a headlight operation unit that are turnably disposed on the control board.

6. The control board of claim 1, further comprising:
    a vehicle function button unit formed as a button on the control board.

7. The control board of claim 6, further comprising:
    a mode scroll unit formed as a button on the control board and adjusting functions of the vehicle function button unit.

* * * * *